March 3, 1964 A. J. A. GIERS ETAL 3,122,926
METHOD AND APPARATUS FOR DYNAMIC BALANCE TESTING OF ROTORS
Filed Aug. 10, 1959 5 Sheets-Sheet 4

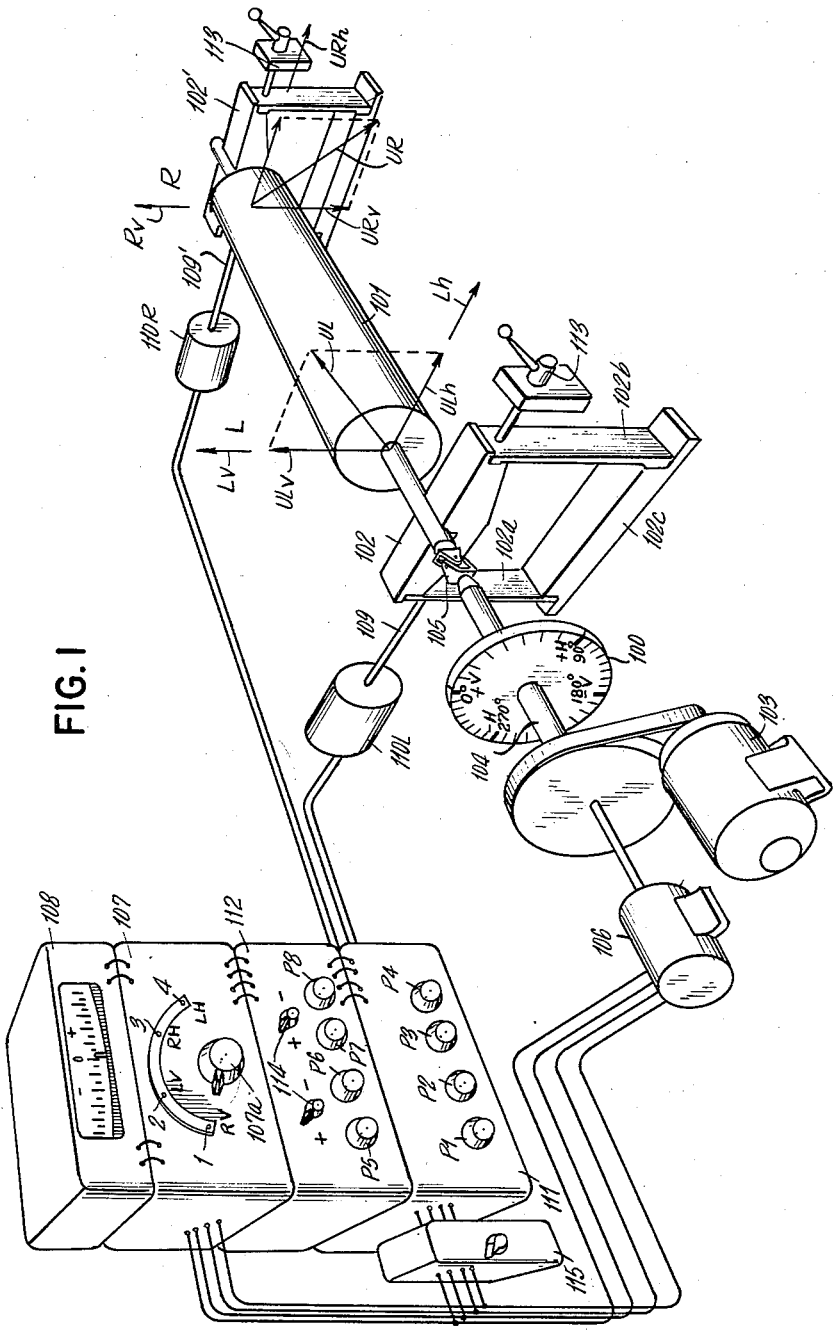

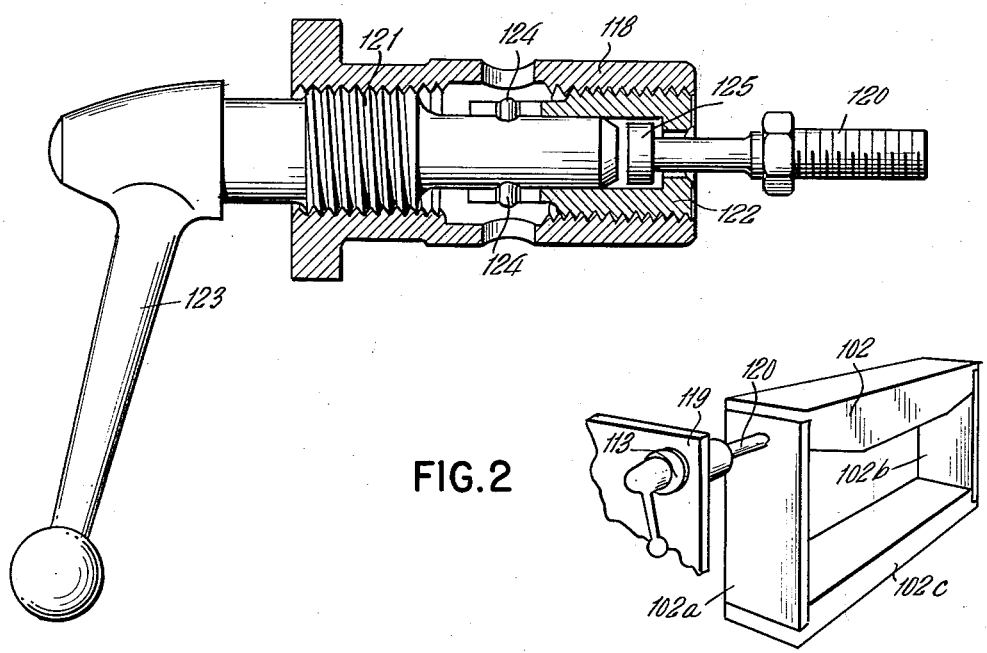
FIG. 3
FIG. 2
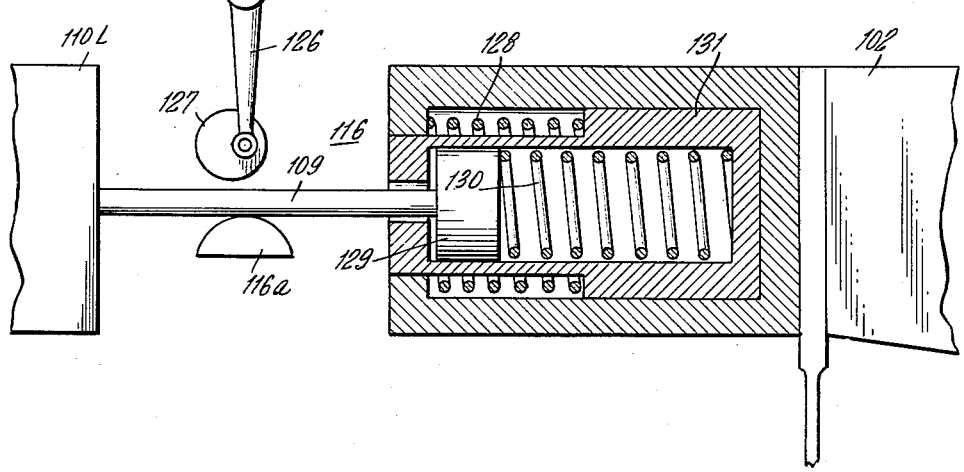
FIG. 6

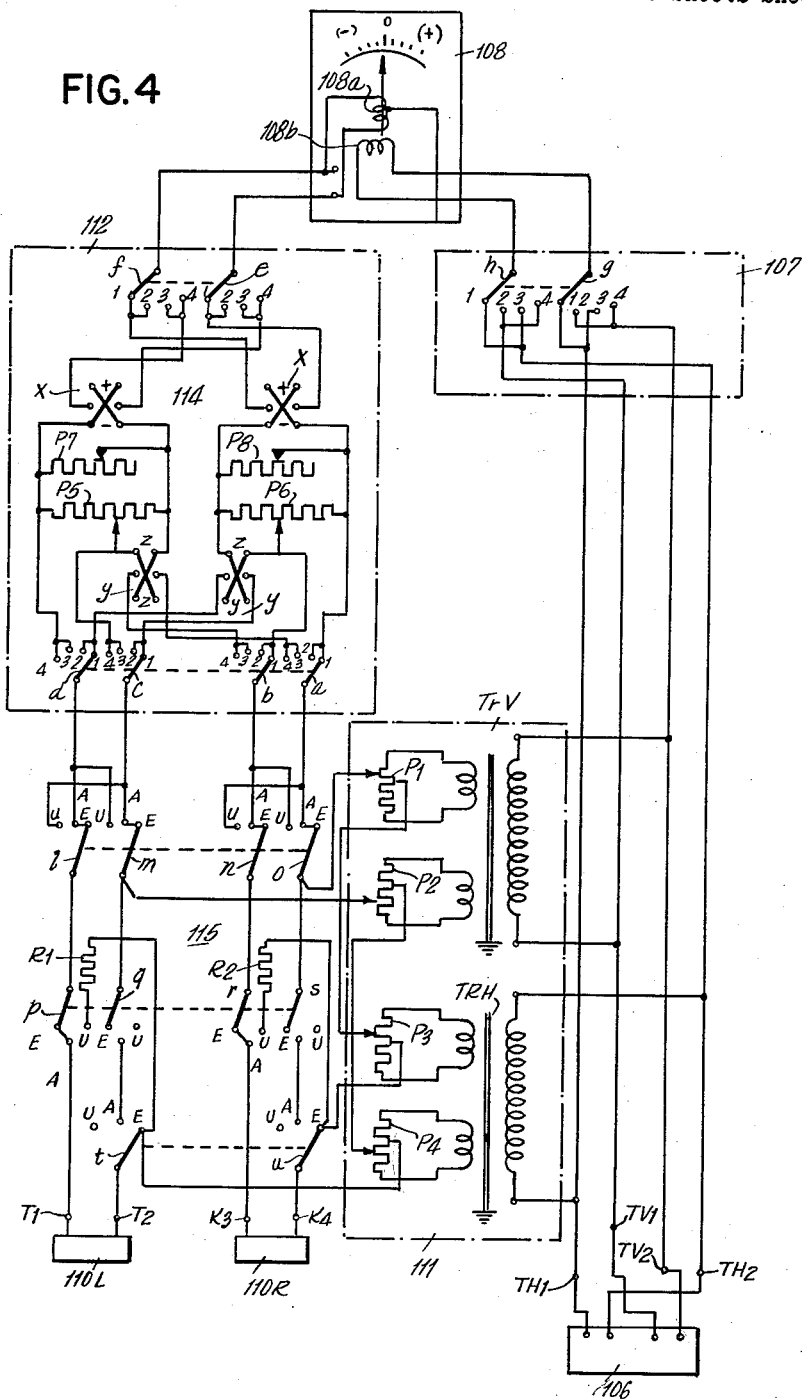

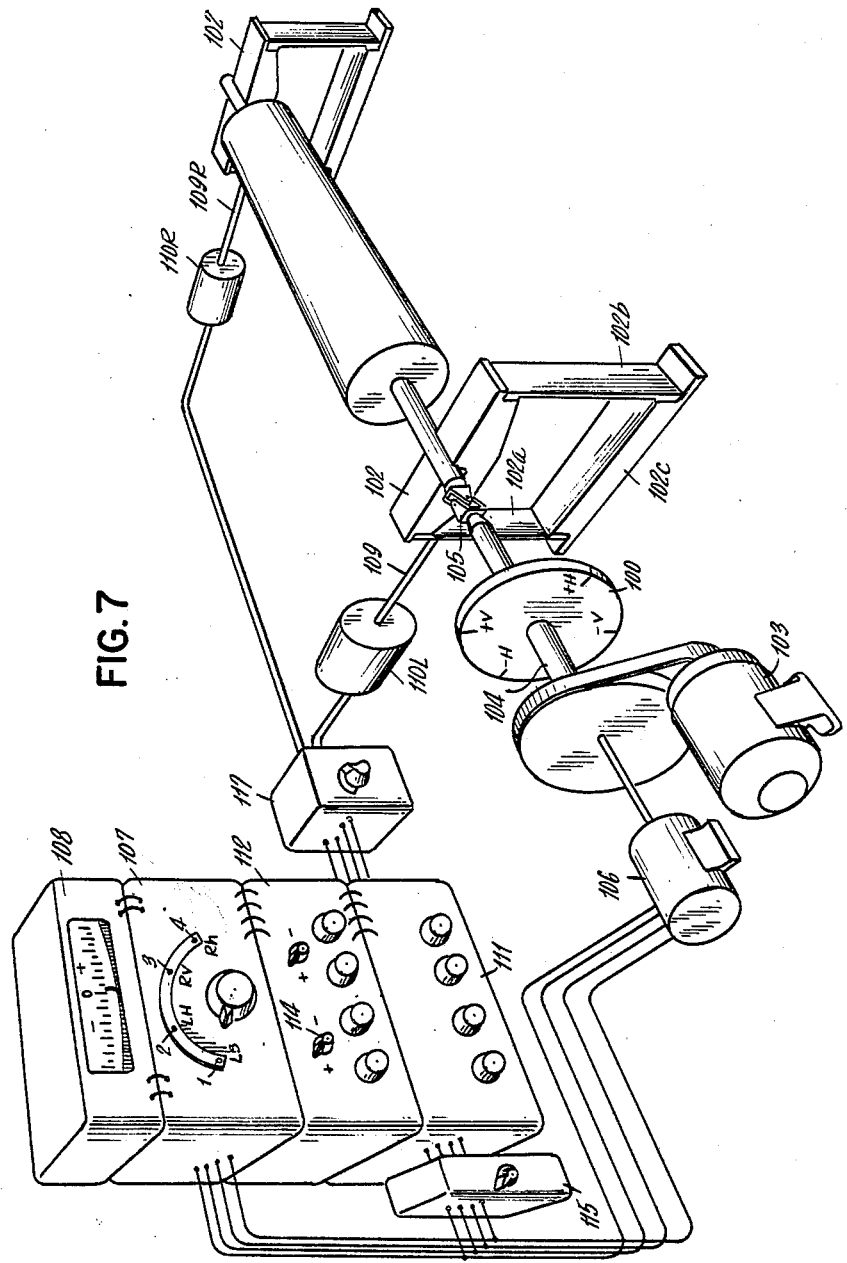

3,122,926
METHOD AND APPARATUS FOR DYNAMIC BALANCE TESTING OF ROTORS
Alfred J. A. Giers, Rossdorf, and Otfrid G. H. Maus, Darmstadt, Germany, assignors to Carl Schenck, Maschinenfabrik G.m.b.H., Darmstadt, Germany, a corporation of Germany
Filed Aug. 10, 1959, Ser. No. 832,714
Claims priority, application Germany Aug. 11, 1958
6 Claims. (Cl. 73—463)

Our invention relates to means for dynamically testing the unbalance inherent in rotating bodies and has for its main object to reduce the number of test runs as well as the total amount of time required for an accurate unbalance analysis.

Any unbalance inherent in a rigid rotor can be analyzed in conventional manner into unbalance components reduced to at least two reference planes extending radially with respect to the rotational axis of the rotor. For this purpose the rotor to be tested is mounted in a balancing machine and placed in rotation at the proper testing speed in bearings capable of oscillating in a given axial plane in response to any original unbalance of the rotor. The oscillations are translated into alternating voltage by means of transducers and the voltage is applied to an electric measuring instrument. Then the effect of the original unbalance upon the instrument indication is reduced to the zero value by superimposing upon the transducer voltage a compensating voltage taken from a phase-reference transmitter operating in synchronism with the rotation of the rotor during a first (simulating) testing run. Then the machine is stopped and the rotor is provided with known calibrating weights. Thereafter a second run (calibrating run) is performed with the rotor rotating at the same speed as in the first run, and an electric potentiometer network, interposed between the transducers and the measuring instrumentalities proper, is then set in the conventional manner for obtaining an indication or definition in the desired measuring units of the unbalance caused by the known calibrating weights, in form of correlated unbalance components, usually in two given reference planes. Thereafter, still in the second measuring run, the difference between the original unbalance and the added calibrating weights can be measured by eliminating the zero compensation effected during the first measuring run. However, if the original unbalance alone is to be measured, a third measuring run is performed with the result of obtaining an indication of the original unbalance components relative to the proper reference planes. During the latter operation, the mechanical unbalance oscillations of the rotor, sensed by the transducers, are translated into corresponding electric criteria correlated to the individual reference planes, and are directly indicated or otherwise utilized in indicating, recording or controlling instruments.

The above-described three-run method known from Patent 2,851,885 of K. Federn and H. Haardt, assigned to the assignee of the present invention, is relatively time-consuming particularly when large workpieces are involved so that a considerable amount of time may elapse until the rotor is accelerated each time up to the proper testing speed.

It has therefore been attempted to do away with the third measuring run by mathematically or graphically composing the difference between the original unbalance and the known calibrating weights, this difference being measurable during the second run. This modified method, however, puts exacting requirements upon the amount of care and mental work required of the attendant personnel. Experience has shown that this is the cause of frequent error.

It is an object of our invention to devise a method which eliminates the disadvantages of the above-mentioned known methods by doing away with the third testing run thus minimizing the time as well as the attention or skill required of the attendant.

To this end, and in accordance with a feature of our invention, we perform the first (simulating) run and also commence the second (calibrating) run in the same manner as in the above-described known method, but after adjusting the electric potentiometer network during the second run, we apply the electric compensation voltages of the first measuring run but with reversed polarity, i.e., 180° phase-displaced, through the electric network upon the measuring instrumentalities, instead of applying thereto the voltages generated by the vibration-responsive transducers. This makes it possible to translate, during the second measuring run, the original electric magnitudes already determined in the first measuring run by compensating the original unbalance, into those component electric magnitudes that correspond to respective components of the original unbalance to be determined. As a result, a definite and accurate analysis of the original unbalance is obtained without the need for a third measuring run. The attendant servicing the balancing machine need only perform a few simple manipulations, thus eliminating most of the sources of trouble heretofore encountered.

Suitable for performing the novel method are the known balancing apparatus which are provided with oscillatable journal means for the rotor and with transducer means for translating the unbalance-responsive oscillations of the rotor or journal bearings into corresponding electric voltages, and with a source of synchronous phase-reference voltage, such apparatus being known, for example, from the above-mentioned Patent 2,851,885. However, for the purposes of our invention, such apparatus is to be provided with control means that selectively permit inactivating the vibration-responsive transducer means during the second run while maintaining the resistance or impedance conditions of the associated unbalance-measuring circuit means unchanged; and it is further necessary to provide these circuit means with additional switches or contacts that permit imposing the compensating electric magnitudes, as set during the first run, upon the measuring instrument means with reversed polarity or phase.

According to a more specific feature of our invention, the above-mentioned control means for inactivating the transducers are formed of arresting devices that permit stopping the journal oscillations by rigidly joining the rotor bearings with the machine frame structure. Such devices permit, after adjusting the electric potentiometer network in the commencing portion of the second run, to rigidly arrest the previously oscillating rotor bearings without interrupting the measuring run and without taking the transducers out of the measuring circuits. However, the transducers then no longer have any effect upon the measuring result, while the compensation magnitudes are switched to act in reversed phase upon the potentiometer network and thus upon the measuring instrument in lieu of the transducer voltages.

According to another, alternative feature of our invention, the desired result is also achieved by providing, in lieu of the means for arresting the oscillatable rotor bearings, a controllable coupling or clutch between these bearings and the respective transducers. After opening the coupling, the oscillations of the bearings can no longer act upon the transducers. This, however, also requires providing switch means for reversing the phase of the electric compensation voltage and for connection of the reversed voltage to the measuring instrument.

According to still another feature of our invention, it is particularly advantageous to perform the novel method with purely electrical means. For this purpose, a switching device is provided which electrically disconnects the transducer means from the measuring circuits and substitute the transducers by corresponding resistance or impedance means, while applying the reversely-poled compensation magnitudes determined during the first measuring run.

The foregoing and further objects and features of our invention will be apparent from, and will be set forth in, the following with reference to the embodiments of the invention illustrated by way of example on the accompanying drawings in which:

FIG. 1 shows schematically and in perspective a balancing apparatus together with explanatory vector diagrams.

FIG. 2 shows schematically, in perspective, one of the oscillatable supports of the rotor bearings with an arresting device according to FIG. 1.

FIG. 3 shows one of the same arresting devices partly in longitudinal section.

FIG. 4 is a schematic circuit diagram of the electric components that form part of the apparatus according to FIG. 1, the same circuit diagram being also applicable to the embodiments according to FIGS. 5 and 7.

FIG. 6 illustrates schematically in perspective and partly in section one of the controllable coupling means used in the apparatus of FIG. 5; and FIG. 7 shows in schematic perspective a balancing apparatus similar to that of FIGS. 1 and 5 but equipped with electric switching means in lieu of the arresting and coupling devices of the preceding embodiments.

Figure 5:
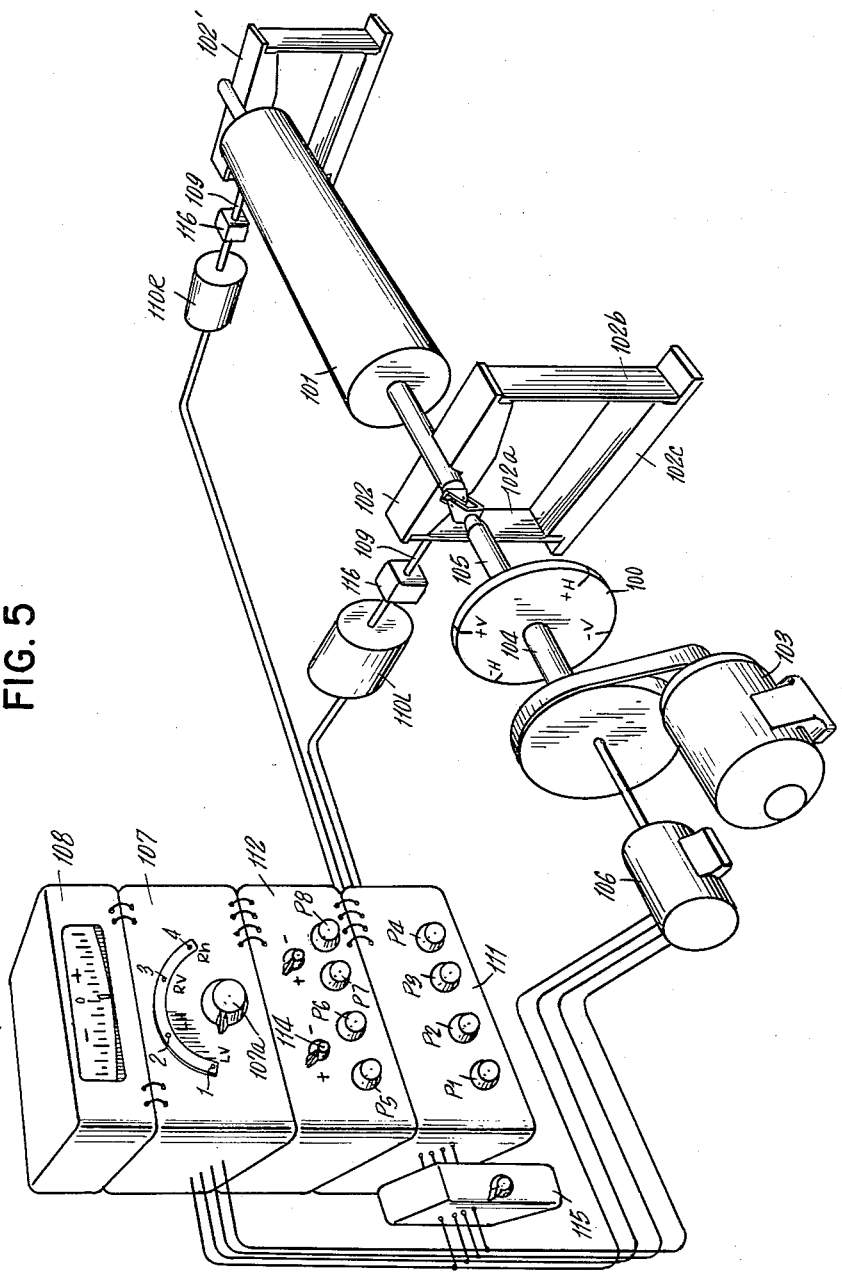
FIG. 5 illustrates a balancing machine similar to that of FIG. 1 but provided with controllable coupling means between the oscillatable journal supports and the transducers.

According to FIG. 1, the rotor 101 to be balanced is journalled on bearing bridges 102 and 102' capable of oscillating in a substantially horizontal plane. The rotor is driven from a motor 103 through a belt transmission, a counter shaft 104, and a Cardanic link 105. A disc 100 with an angular scale division of 0° to 360° is firmly mounted on shaft 104. A phase-reference transmitter 106 is connected with shaft 104 and thus runs in synchronism with the rotor and in a fixed angular relation thereto. The phase transmitter supplies two alternating currents 90° phase-displaced from each other. The transmitter 106 may consist of a dynamo-electric sine-cosine wave generator, although other known types of phase-reference transmitters may also be used such as photoelectrically-controlled or electronic oscillation generators. The alternating reference currents from phase transmitter 106 are supplied through a combined component-and-plane selector switch 107 to the field winding of a wattmetric instrument 108, the field winding being denoted by 108b in FIG. 4. FIG. 4 also shows that the selector switch 107 has a total of eight movable switch contacts or fingers denoted by $a$ through $h$ and can be turned by means of a knob 107a (FIG. 1), to any one of four positions numbered 1, 2, 3, 4 and designated on the face plate of the switching device 107 by L$v$, L$h$, R$v$, R$h$ respectively in order to exhibit that in the respective positions of knob 107a the instrument 108 will indicate the left-vertical, left-horizontal, right-vertical, right-horizontal unbalance components respectively.

The meaning of the just-mentioned designations on the face plate of switching device 107 will be more fully understood from the vector diagrams entered in FIG. 1. The two arbitrarily chosen reference planes, radial to the rotor axis, are denoted by L and R respectively. When the selector switch 107 is in the first position L$v$, the instrument 108 indicates the magnitude of the vertical component L$v$ of unbalance in the left reference plane, this magnitude being represented by the vector UL$v$. When the switch 107 is in the second position L$h$, the instrument 108 indicates the horizontal unbalance component L$h$ in the left reference plane, the vectorial quantity then measured being shown in FIG. 1 at UL$h$. The resultant of these two measured and indicated vectorial magnitudes is the unbalance vector UL. Consequently, the two measurements made with switch 107 sequentially in positions 1 and 2, afford the determination of the rotor unbalance reduced to the left reference plane with respect to magnitude and angular position.

Analogously, when knob 107a of selector switch 107 is placed in third position R$v$ the vertical unbalance magnitude UR$v$ in the right reference plane R is indicated by instrument 108; and when the switch 107 is thereafter placed in fourth position R$h$, the instrument indicates the magnitude of the horizontal unbalance component UR$h$ in the right reference plane.

The mechanical vibrations of the bearing bridges 102 and 102' are transmitted through rods 109 and 109' to respective oscillation pickups 110L and 110R respectively. The pickups may consist of transducers of the moving-coil or variable-reluctance type, although any other suitable types of transducers capable of translating mechanical vibration into alternating voltage may be used. The alternating voltages generated in pickups 110L and 110R are applied to a compensating device 111 of a type generally known from the above-mentioned Patent 2,851,885. In compensator 111 the transducer voltages are combined with superimposed compensating voltages supplied from the phase-reference transmitter 106. The resultant measuring voltages are supplied through an electric potentiometer network 112 and the above-mentioned component-and-plane selector switch 107 to the moving coil of the wattmetric instrument 108, this coil being denoted by 108a in FIG. 4. The compensating voltages derived from the phase-reference transmitter 106 can be so adjusted by the operator that, in each of the sequentially adjusted positions of switch 107, the indication of instrument 108 is zero. Such adjustment is made by displacing the slidable taps of four potentiometers P1 to P4 (FIG. 4) of the compensator 111. For simplicity, the four knobs on the face of the compensator 111 in FIG. 1 are denoted by the same reference characters P1 to P4 used in FIG. 4 for denoting the respective potentiometers whose sliders are displaced when turning the respective knobs.

While as far as described above, the apparatus of FIG. 1 is similar in substance to the one known from Patent 2,851,885, the apparatus is made suitable for the purposes of the present invention by providing the arresting devices 113 which permit blocking the bearing bridges 102, 102' to prevent them from oscillating in response to rotor unbalance; and the invention further requires the provision of pole reversing switches such as the two switches denoted by 114 in FIG. 1. Before describing these added components and their coaction with the other components of the system, it will be helpful to explain the electric details of the compensator 111, the potentiometer network 112, and the component-and-plane selector switch 107.

In the circuit diagram of FIG. 4, the selector switch denoted by 107 in FIG. 1 is repesented by its eight movable switch contacts or contact fingers *a* through *h*. These fingers move conjointly between the switch positions 1, 2, 3 and 4. The switches denoted by 114 in FIG. 1 and incorporated in the potentiometric device 112 are represented in FIG. 4 by a pair of pole-reversing switches y—z and by another pair of pole-reversing switches denoted by *x*. The switch 115 in FIG. 1 corresponds to the ten switch contacts or fingers denoted in FIG. 4 by *l* through *u*. These fingers can be shifted conjointly between three positions denoted by E, A and U.

The device according to FIG. 4 has two pairs of terminals TH1, TH2 and TV1, TV2 to which the two 90° phase-displaced alternating voltages of the phase transmitter 106 are connected. Depending upon the selected position of the contact fingers *g* and *h* of switch 107, one of these two voltages is impressed upon the field coil 108*b* of wattmeter 108. The two measuring voltages generated in the transducers 110L and 110R are connected to respective pairs of terminals T1, T2 and K3, K4. In the known devices the switch 115 with its ten contact fingers *l* to *u* has only the two switch positions A and E. For that reason, the performance obtained with switch 107 set to these two positions will first be discussed.

When the rotor is properly inserted into the machine and brought up to normal speed, the first (simulating) run is performed with switch 15 (contact fingers *l–u*) in position E. The current from terminal T2, for example, then flows through the potentiometers P4 and P2 of the compensator 111 to the entrance of the potentiometric network 112. By adjusting the sliders of potentiometers P4 and P2 (denoted in FIG. 1 also by P4 and P2), the measuring voltage from the transducers can be compensated by superposition of equivalent and oppositely poled voltages from the phase transmitter 106 so that the resulting voltage measured by instrument 108 is reduced to zero. The same applies to the current flowing from terminal K4 of pickup 110R through potentiometers P3 and P1 of the compensator 111. That is, by properly adjusting the sliders of these potentiometers the resulting voltage applied to the measuring instrument can be reduced to zero. The potentiometers P1 to P4 are energized from transformers T*r*V and T*r*H whose respective primary windings are energized from the phase transmitter 106.

The compensated voltages supplied from the compensator 111 to the entrance of the potentiometer network 112 are impressed upon the potentiometer P5 or P6, depending upon the selected position of the contact fingers *a* to *d* of switch 107. The sliders on the potentiometers P5 and P6 as well as those of rheostats P7 and P8, described below, can be displaced by means of knobs which for simplicity are denoted in FIG. 1 by the same reference characters P5 through P8 respectively. Depending upon the position of the slider of potentiometers P5 or P6, the tapped-off output voltage of this potentiometer is impressed upon the moving coil 108*a* of instrument 108. The position of contact fingers *f* and *e* in switch 107 then determine whether the measurement applies to the reference plane L or R.

The performance and purpose of the components thus far described will be more fully understood from the description of the first (simulating) run given presently.

After inserting the rotor 101 (FIG. 1) into the machine and bringing it up to speed, the four-position switch 107 is set, for example, to first position RV. The wattmeter 108 will now show some deflection indicative of an original unbalance of the rotor. The attendant then shifts the slider of the potentiometer P1 to a position in which the instrument deflection is reduced to zero. Thereafter the same procedure is repeated for the second, third and fourth positions of switch 107, and each time the instrument deflection is zeroed by setting the corresponding potentiometer P2, P3, P4. When this simulating run is completed, the rotor, although actually unbalanced, has no effect upon the instrument indication regardless of the position to which the four-position switch 107 may be set. That is, the apparatus has now the effect of simulating perfect balance on the rotor, and any further calibrating adjustments can be made as if a balanced rotor was running.

After completion of the simulating run, the drive motor 103 is stopped. A calibrating weight of known magnitude is inserted on the rotor 101 in the left reference plane L, for instance at 0° of the scale disc 100. Then the rotor is again set in revolution at the previous speed, and the apparatus is now ready for the second (calibrating) run. The vibrations produced at the bearing bridges 102, 102' are now due to the resultant effect of the original unbalance plus the added calibrating weights. However, the instrument 108 can respond only to the effect of the calibrating weight. The potentiometers P5 and P6 of the network 112, therefore, can now be adjusted so that the calibrating weight in the left reference plane does not show up in the indication for the right plane. Analogously, a calibrating weight is added to the right reference plane in an angular position different from the calibrating weight in the left reference plane, for example 90° displaced therefrom. Then, during the same run, because of its different angular position, the calibrating weight added in the right reference plane can be made to have no effect upon the indication of unbalance in the left plane. These adjustments are made by operating the four-position switch 107 (contact fingers *a* to *g*) and the sliders of potentiometers P5 and P6, substantially in the manner described above with reference to the simulating run, it being understood, of course, that during the calibrating run the adjustment of the simulating potentiometers P1 through P4 is not disturbed. In order to obtain proper indication during the calibrating run, it is in some cases necessary to reverse the pole-reversing switches y—z.

In each selected position L*v*, L*h*, R*v*, R*h* of the four-position switch 107, the wattmeter 108 now shows a deflection denoting a definitely known amount of unbalance corresponding to the added calibrating weights. Consequently the sensitivity control rheostats P7 and P8 may now be set to make the wattmeter indication correspond to any convenient ratio of calibrating weight to indication, so that the indication may read in centimeter gram per scale division, or in gram per scale division, or in millimeter drilling depth per scale division, or the like units to be directly read off.

During this performance, the polarity can be changed by the plus-minus switches *x*, 114 depending upon whether it is necessary for balance correction to add material to the rotor or to remove material, for example by drilling.

The apparatus is now completely calibrated and set for the measuring operation proper.

If thereafter the switch 115 with contact fingers *l* to *u* is shifted from position E to position A, the measuring voltages no longer pass through the potentiometers P1 to P4 but are directly applied to the potentiometer network 112. Consequently now the sum of the original unbalance plus that due to the added calibrating weights is measured. While this permits calculating the original unbalance components, it is customary and preferable to stop the drive motor, remove the calibrating weight, and then perform a third measuring run for directly indicating the components of original unbalance.

Now, according to our invention and by virtue of the devices already described above, the third measuring run can be dispensed with without affecting the accuracy of the measuring results, thus doing away with the necessity of decelerating the rotor, removing the calibrating weight, and again accelerating the rotor up to normal testing speed.

To achieve such saving in operating time, we perform the method as follows. No change is made in the first (simulating) run and no change is made in the second (calibrating) run as described in the foregoing. However, instead of stopping the machine after completion of the calibrating operation performed by setting the potentiometer network 112, the second run is continued without change in rotor speed; but the bearing bridges 102, 102' are arrested by means of the arresting devices 113. Thereafter the compensating voltages available at the output leads of compensator 111 are supplied to the measuring instrument 108 through the potentiometer network 112 and the selector switch 107. These compensating voltages, however, are now given a reversed poling or phase by actuating the switch 114 of the potentiometer network 112 or the switch 115 (FIGS. 1, 4). It will be recognized that the compensator voltages, adjusted during the first (simulating) run, are now made to act through the potentiometer network 112 upon the measuring instrument whereas the transducers do not generate voltages. As a result, the instrument produces an indication which, in the respective four positions of selector switch 107, is indicative of the respective unbalance components to be determined.

An embodiment of a suitable arresting device 113 is shown more in detail in FIGS. 2 and 3. It comprises a sleeve 118 rigidly mounted on the housing of the supporting structure 119. Fastened to the bearing bridge 102 is a bolt 120. A spindle 121 is in threaded engagement with the sleeve 118. A bushing 122 concentrically seated in sleeve 118 is also in threaded engagement therewith, but the screw threads of spindle 121 and sleeve 122 have mutually opposed sense so that when a handle 123 fastened to spindle 121 is rotated, the spindle and the bushing 122 move toward or away from each other depending upon the direction of rotation, the bushing 122 being entrained rotationally by means of pins 124 passing through respective slots of the bushing 122. When the arresting device is in operation, the head 125 of bolt 120 is firmly clamped between the spindle 121 and the bottom of the bushing 122, thus rigidly joining the bearing bridge 102 with the machine frame structure.

The embodiment shown in FIG. 5 is a modification of the one described above with reference to FIGS. 1 and 4. It differs in that, in lieu of the above-described arresting devices 113, a controllable coupling or clutch 116 is mounted between the bearing bridges 102 and the respective transducers 110L and 110R. An example of a suitable coupling 116 is shown in FIG. 6. The connecting rod 109 of the pickup 110 can be clamped fast between a fixed support 116a and an eccentric 127 to be actuated by means of a handle 126. When the rod 109 is clamped fast, the oscillatory motion of the bearing bridge 102 is not impeded. When the bearing bridge 102 moves toward the right, a spring 128 will yield so that a pressure plate 129 mounted on the rod 109 remains fixed in space. When the bearing bridge 102 moves to the left, a spring 130 will yield so that the plate 129 remains spacially fixed. The two springs 128 and 130 are pre-tensioned so that when the eccentric 127 is loosened, the pressure plate 129 and the guiding bushing 131 remain pressed against respective stops, with the result that the connecting rod 109 synchronously transmits the bridge movements to the moving part of the transducer 110.

In the embodiment shown in FIG. 7, a switch 117 is provided which permits electrically isolating the transducers 110L and 110R from the measuring circuits after the potentiometer network 112 is properly adjusted during the second measuring run. At the same time, substitute resistors are inserted into the measuring device to take the place of the respective resistances of the transducers 110L, 110R. These resistors, corresponding to those denoted by R1 and R2 in FIG. 4, have the same impedance as the respective pickups 10L and 10R.

According to an improvement feature of the invention, the performance of the switch 117 according to FIG. 7 is combined according to FIG. 4 with the switch 115 whose contact fingers are denoted by *l* to *u*. During the second measuring run, after the potentiometer network 112 is set as described above, the switch 115 is placed into the third position U. In this position, the terminals T1, T2, K3 and K4 are disconnected from the measuring circuitry. The voltage at the potentiometers P1, P2, P3 and P4 then drives a current through the substitute resistors R1 and R2 which is supplied to the contact fingers *a, b, c, d* through the respective contact fingers *l, m, n, o*, but with reversed polarity. These two currents have exactly the same phase position and magnitude as the measuring currents caused by the original unbalance of the rotor. It is not necessary therefore to remove the calibrating weights and to perform a third measuring run.

It will be obvious to those skilled in the art that the invention is not limited to the wattmetric measuring devices chosen for illustration and explanation, but is also applicable with other known balance measuring devices such as those using similar wattmeters for simultaneous indication of the respectively different unbalance components, or vector-measuring devices, or phase-sensitive direct current devices.

We claim:

1. Rotor balance testing apparatus, comprising vibratorily mounted bearing means and drive means for rotating the rotor in said bearing means, vibration-responsive transducer means responsive to vibration of said bearing means for providing variable transducer voltage, a source of phase reference voltage synchronous with the rotor, measuring instrument means, a compensator having adjustable potentiometer means connecting said transducer means and said source to said instrument means and being adjustable to compensate the transducer voltage by compensating voltage from said source, whereby said instrument means can be zeroed during a first run of the rotor; a potentiometer network electrically interposed between said transducer means and compensator on the one hand and said instrument means on the other hand and being potentiometrically adjustable during a second run of the rotor with added calibrating weights to make the response of said instrument means indicative of the effect of each calibrating weight only in its own radial plane; pole reversing switch means electrically connected between said compensator and said instrument means for reversing the phase of said compensating voltage, and selective transducer control means having a first condition wherein the transducer is active and a second condition for stopping the transducer from passing transducer voltage to said compensator and network, said compensator and said network having respective circuit resistances substantially independent of the selected condition of said control means, said control means connecting said transducer actively with said compensator and network when in said first condition and being switchable to said second condition when said reversing switch applies phase-reversed compensating voltage through said adjusted network to said instrument means, whereby due to switching of said control means the response of said instrument means after adjustment of said network is caused to correspond to the original unbalance of the rotor during continuance of the second run of the rotor.

2. Rotor balance testing apparatus for obtaining values from which unbalance of rotors can be determined, comprising vibratorily mounted bearing means and drive means for rotating the rotor in said bearing means, vibration-responsive transducer means responsive to vibration of said bearing means for providing alternating transducer voltage, a source of phase reference voltage synchronous with the rotor, measuring instrument means, a compensator having adjustable potentiometer means connecting said transducer means and said source to said instrument means and being adjustable to compensate the transducer voltage by compensating voltage from said source, whereby said instrument means can be zeroed during a first run of the rotor; a potentiometer network electrically interposed between said transducer means and compensator on the one hand and said instrument means on the other hand and being potentiometrically adjustable during a second run of the rotor with added calibrating weights to make the response of said instrument means indicative of the effect of each calibrating weight only in its own radial plane; pole reversing switch means electrically connected between said compensator and said instrument means for reversing the phase of said compensating voltage, a controllable arresting device engageable with said bearing means for stopping said bearing means from vibrating to thereby prevent said transducer means from generating voltage while remaining electrically connected with said network and compensator, whereby the response of said instrument means, after adjustment of said network and reversing of said switch means and activation of said arresting device, is caused to correspond to the original unbalance of the rotor during continuance of the second run of the rotor.

3. Rotor balance testing apparatus, comprising vibratorily mounted bearing means and drive means for rotating the rotor in said bearing means, vibration-responsive transducer means responsive to vibration of said bearing means for providing alternating transducer voltage, a source of phase reference voltage synchronous with the rotor and at a given phase angle relative thereto, measuring instrument means, a compensator having adjustable potentiometer means connecting said transducer means and said source to said instrument means and being adjustable to compensate the transducer voltage by compensating voltage from said source, whereby said instrument means can be zeroed during a first run of the rotor; a potentiometer network electrically interposed between said transducer means and compensator on the one hand and said instrument means on the other hand and being potentiometrically adjustable during a second run of the rotor with added calibrating weights to make the response of said instrument means indicative of rotor unbalance so that the calibrating weight in one plane does not show up in the indication for the other plane; pole reversing switch means electrically connected between said compensator and said instrument means for reversing the phase of said compensating voltage, mechanical coupling means interposed between said bearing means and said transducer means and having control means for uncoupling said transducer means from said bearing means to prevent said transducer means from generating voltage while remaining electrically connected with said network and compensator, whereby the response of said instrument means, after adjustment of said network and reversing of said switch means and uncoupling of said transducer means, is caused to correspond to the original unbalance of the rotor during continuance of the second run of the rotor.

4. Rotor balance testing apparatus, comprising vibratorily mounted bearing means and drive means for rotating the rotor in said bearing means, vibration-responsive transducer means responsive to vibration of said bearing means for providing alternating transducer voltage, a source of phase reference voltage synchronous with the rotor and at a given phase angle relative thereto, measuring instrument means, a compensator having adjustable potentiometer means connecting said transducer means and said source to said instrument means and being adjustable to compensate the transducer voltage by compensating voltage from said source, whereby said instrument means can be zeroed during a first run of the rotor; a potentiometer network electrically interposed between said transducer means and compensator on the one hand and said instrument means on the other hand and being potentiometrically adjustable during a second run of the rotor with added calibrating weights to make the response of said instrument means indicative of rotor unbalance so that the calibrating weight in one plane does not show up in the indication for the other plane; pole reversing switch means electrically connected between said compensator and said instrument means for reversing the phase of said compensating voltage, an electric control switch disposed between said network and said transducer means and having a position in which said transducer means are connected with said network and another position in which said transducer means are electrically disconnected from said network, substitute impedance means having substantially the same impedance as said transducer means, said control switch connecting said impedance means in lieu of said transducer means with said network and said compensator when said control switch is in said other position, whereby the response of said instrument means after adjustment of said network is caused to correspond to the original unbalance of the rotor during continuance of the second run of the rotor.

5. Rotor balance testing apparatus, comprising rotor rotating means, vibration-responsive transducer means responsive to the vibration of said rotor for providing variable transducer voltage, a source of phase-reference voltage synchronous with the rotor and at a given phase angle relative thereto and corresponding to two radial directions, measuring instrument means, a compensator connecting said transducer means and said source to said instrument means for rendering said instrument means responsive to transducer voltage and reference voltage, said compensator having means for superimposing upon the transducer voltage a compensating voltage from said source whereby said instrument means can be zeroed during a first run of the rotor, a potentiometer network electrically interposed between said compensator means and said instrument means and being adjustable during a second run of the rotor with added calibrating weights to make the response of said instrument means to said transducer means indicative of the effect of each calibrating weight only in its own radial plane; and selective transducer control means having a first condition wherein the transducer is active and a second condition for stopping the transducer from passing transducer voltage to said compensator and network, said control means connecting said transducer actively with said compensator and network when in said first condition and being switched to said second condition to apply compensating voltage to said instrument means.

6. A rotor unbalance testing apparatus comprising rotor rotating means, right and left vibration transducer means positioned at the respective longitudinal positions of the rotor and each responding to the vibrations of said rotors at its right and left portions, phase reference means synchronous with the rotation of said rotor at a given phase angle relative thereto and having two electrical outputs corresponding in phase to two radial directions, wattmetric indicating means connected to said transducer means and said phase reference means, variable voltage means connected to said phase reference means and in opposing relation to said vibration transducer means for neutralizing the effect of said rotating body upon said vibration transducer means during a first run of the rotor, circuit means comprising said transducer means and said variable voltage means, potentiometer means connecting said circuit means with said wattmetric indicating means; said potentiometer means being adjustable during a second run of the rotor, when calibrating weights are secured to the rotor in two radial planes and two radial directions, to render null the effect upon said wattmetric indicating means of each calibrating weight outside its own radial plane, whereby the calibrating weight on the left side does not show up in the indication for the right vibration transducer means and the calibrating means on the right side does not show up for the indication of the left vibration transducer means, selective control means having a first condition wherein the transducer means are active and a second condition wherein the transducer means produce no voltage, so that said indicating means are effected only by the voltage from said voltage means, said control means connecting said transducer means actively with said voltage means and said potentiometer means in said first condition and being switched to said second condition to apply the voltage output of said voltage means to said wattmetric indicating means, said control means including phase reversal means connected between said voltage means and said wattmetric indicating means.

References Cited in the file of this patent

UNITED STATES PATENTS

| | | |
|---|---|---|
| 2,130,122 | Dybvig | Sept. 13, 1938 |
| 2,243,379 | Johnson | May 27, 1941 |
| 2,706,399 | Federn | Apr. 19, 1955 |
| 2,816,445 | Rambo | Dec. 17, 1957 |
| 2,851,885 | Federn et al. | Sept. 16, 1958 |
| 2,904,362 | Moore | Sept. 15, 1959 |
| 2,966,801 | Nemec et al. | Jan. 3, 1961 |